(12) United States Patent
Flanery et al.

(10) Patent No.: US 7,674,303 B2
(45) Date of Patent: Mar. 9, 2010

(54) METHODS FOR BINDING PARTICULATE SOLIDS

(75) Inventors: Thomas K. Flanery, Worthington, KY (US); Lorence M. Moot, Cohutta, GA (US); Lawrence W. Umstadter, Orlando, FL (US)

(73) Assignee: Kela Energy, LLC, Orlando, FL (US)

( * ) Notice: Subject to any disclaimer, the term of this patent is extended or adjusted under 35 U.S.C. 154(b) by 1152 days.

(21) Appl. No.: 11/013,948

(22) Filed: Dec. 16, 2004

(65) Prior Publication Data

US 2005/0132643 A1    Jun. 23, 2005

Related U.S. Application Data

(60) Provisional application No. 60/530,728, filed on Dec. 17, 2003.

(51) Int. Cl.
*C10L 5/00* (2006.01)
*C10L 5/08* (2006.01)
*B29B 17/00* (2006.01)

(52) U.S. Cl. ............... 44/607; 264/5; 264/37.33
(58) Field of Classification Search ............ 44/607; 264/5, 37.33
See application file for complete search history.

(56) References Cited

U.S. PATENT DOCUMENTS

| | | | |
|---|---|---|---|
| 4,015,951 A | 4/1977 | Gunnerman | 44/10 |
| 4,236,897 A | 12/1980 | Johnston | 44/10 |
| 4,308,033 A | 12/1981 | Gunnerman | 44/6 |
| 4,352,856 A | 10/1982 | Smillie | 428/329 |
| 4,369,042 A | 1/1983 | Schafer et al. | 44/15 |
| 4,389,218 A | 6/1983 | Pike | 44/6 |
| 4,529,407 A | 7/1985 | Johnston et al. | 44/21 |
| 4,586,936 A | 5/1986 | Schaffer et al. | 44/10 |
| 4,681,597 A | 7/1987 | Byrne et al. | 44/15 |
| 4,702,746 A | 10/1987 | Finch | 44/14 |
| 4,738,684 A | 4/1988 | Murphy | 44/591 |
| 5,124,104 A | 6/1992 | Holley | 264/113 |
| 5,238,629 A | 8/1993 | Davidson | 264/123 |
| 5,244,473 A | 9/1993 | Sardessai et al. | 44/553 |
| 5,264,007 A | 11/1993 | Lask | 44/564 |
| 5,342,418 A | 8/1994 | Jesse | 44/589 |
| 5,376,156 A | 12/1994 | Schraufstetter et al. | 44/593 |
| 5,411,560 A | 5/1995 | Mainwaring et al. | 44/592 |
| 5,599,361 A | 2/1997 | Ford, Jr. | 44/553 |
| 5,643,342 A | 7/1997 | Andrews | 44/530 |
| 5,743,924 A | 4/1998 | Dospoy et al. | 44/553 |
| 5,916,826 A * | 6/1999 | White | 44/551 |
| 5,951,712 A * | 9/1999 | Campbell | 264/37.33 |
| 5,980,595 A | 11/1999 | Andrews | 44/530 |
| 6,001,143 A | 12/1999 | Rees et al. | 44/552 |
| 6,013,116 A | 1/2000 | Major et al. | 44/551 |
| 6,113,659 A | 9/2000 | Logaraj et al. | 44/280 |
| 6,165,238 A | 12/2000 | Parkinson et al. | 44/579 |
| 6,214,064 B1 | 4/2001 | Boss et al. | 44/593 |
| 6,217,625 B1 | 4/2001 | McDermott et al. | 44/550 |
| 6,271,270 B1 * | 8/2001 | Muzzy et al. | 521/48 |
| 6,379,489 B1 | 4/2002 | Goulet et al. | 156/344 |
| 6,426,026 B1 | 7/2002 | Avgousti et al. | 264/143 |
| 6,509,392 B1 | 1/2003 | Jhaveri et al. | 523/142 |
| 6,530,966 B1 | 3/2003 | Kriech et al. | 44/542 |
| 6,573,314 B1 | 6/2003 | Knudsen et al. | 523/223 |
| 6,582,486 B1 | 6/2003 | Delpiano et al. | 44/589 |
| 6,589,553 B2 | 7/2003 | Li et al. | 424/461 |
| 6,626,966 B2 | 9/2003 | Shimasaki et al. | 44/550 |
| 6,635,093 B1 | 10/2003 | Schoen et al. | 44/553 |
| 2001/0013197 A1 * | 8/2001 | White | 44/552 |

OTHER PUBLICATIONS

Popovic, A., Djdordjevic, D., J. Cerb. Chem. Soc., 2005, 70(12), 1497-1513.*

* cited by examiner

*Primary Examiner*—Glenn Caldarola
*Assistant Examiner*—Jim Goloboy
(74) *Attorney, Agent, or Firm*—Thomas, Kayden, Horstemeyer & Risley, LLP

(57) ABSTRACT

Provided are methods for binding particulate solids in a polymer fiber matrix utilizing composite waste products. A mixture of composite waste products and particulate solids is formed into solid products to create degradation resistant solid units which capture the particulate solids.

27 Claims, 6 Drawing Sheets

METHODS FOR BINDING PARTICULATE SOLIDS

CROSS-REFERENCE TO RELATED APPLICATION

This application claims priority to co-pending U.S. provisional application entitled, "METHOD FOR BINDING PARTICULATE SOLIDS," having Ser. No. 60/530,728, filed Dec. 17, 2003, which is entirely incorporated herein by reference.

TECHNICAL FIELD

The present disclosure is generally related to solid form production and, more particularly, is related to methods for binding particulate solids.

BACKGROUND

In the past, particulate materials, such as coal fines, coke breeze, saw dust, and other biomass wastes, have presented storage, handling, and processing challenges. Additionally, metal oxides from blast furnaces, basic oxygen furnaces and electric arc furnaces have routinely been discarded, in large quantities, creating a source of pollution and presenting an environmental hazard, which continues for decades. Further, composite waste products, including post-consumer and post-industrial carpet waste, are routinely discarded into waste storage facilities, such as landfills. In addition to presenting challenges related to handling the composite waste products, the slow rate of decomposition results in an unfavorable environmental impact that continues for decades.

Prior attempts at disposing of coke breeze, coal fines, and other particulate solids by producing solid forms, such as briquettes or pellets, have been largely unsuccessful because the particulate solids do not adequately bind and the resulting product can be mechanically unstable, disintegrating or degrading back into small, fine particles during storage and handling. Other attempts at producing solid forms from the particulate solids may use costly binder materials, such as petroleum pitch or water-based latexes, and may use costly and complex processing techniques. Water-based materials will reduce the heating value of fuel based solids and produce a formed material which is unstable during outside storage and transport and may disintegrate causing fugitive dust emissions or ground water contamination. Further, previous attempts have utilized binders, including petroleum-based materials, which become tacky and difficult to transport at ambient and elevated temperatures, and may cause contamination and run-off problems when stored outside.

Thus, a heretofore-unaddressed need exists in the industry to address the aforementioned deficiencies and inadequacies.

SUMMARY

Briefly described, an embodiment of the present disclosure can be viewed as a method for binding particulate solids, comprising: reducing a composite waste product; adding particulate solids to the composite waste product; blending the particulate solids with the composite waste product, wherein the particulate solids and the composite waste product constitute a consistent mixture; adding energy to the mixture to increase a process temperature, such that a component of the composite waste product changes from a solid state to a fluid state; and forming the mixture into solid formed products.

Another embodiment of the present disclosure can also be viewed as a method for capturing particulate solids in a degradation resistant form, comprising: a reducing means for shredding or pelletizing carpet; a supplying means for adding particulate solids to the carpet; a mixing means for blending the carpet and the particulate solids into a mixture; a heating means for elevating the temperature of the mixture such that a binder element of the carpet achieves a liquid state and a fiber element of the carpet retains a solid state; and a forming means for converting the mixture into a formed solid, wherein the formed solid comprises a polymer fiber matrix which captures the particulate solids.

Another embodiment of the present disclosure can be viewed as a degradation resistant fiber matrix solid product comprising: a composite waste product including a binder element and a fiber element, wherein the binder element fluidizes at a first temperature, wherein the fiber element fluidizes at a second temperature, and wherein the first temperature is lower than the second temperature; and a particulate solid product, wherein the binder captures the particulate solid product when blended at a temperature in the range between the first temperature and the second temperature.

Other methods, objects, and features of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
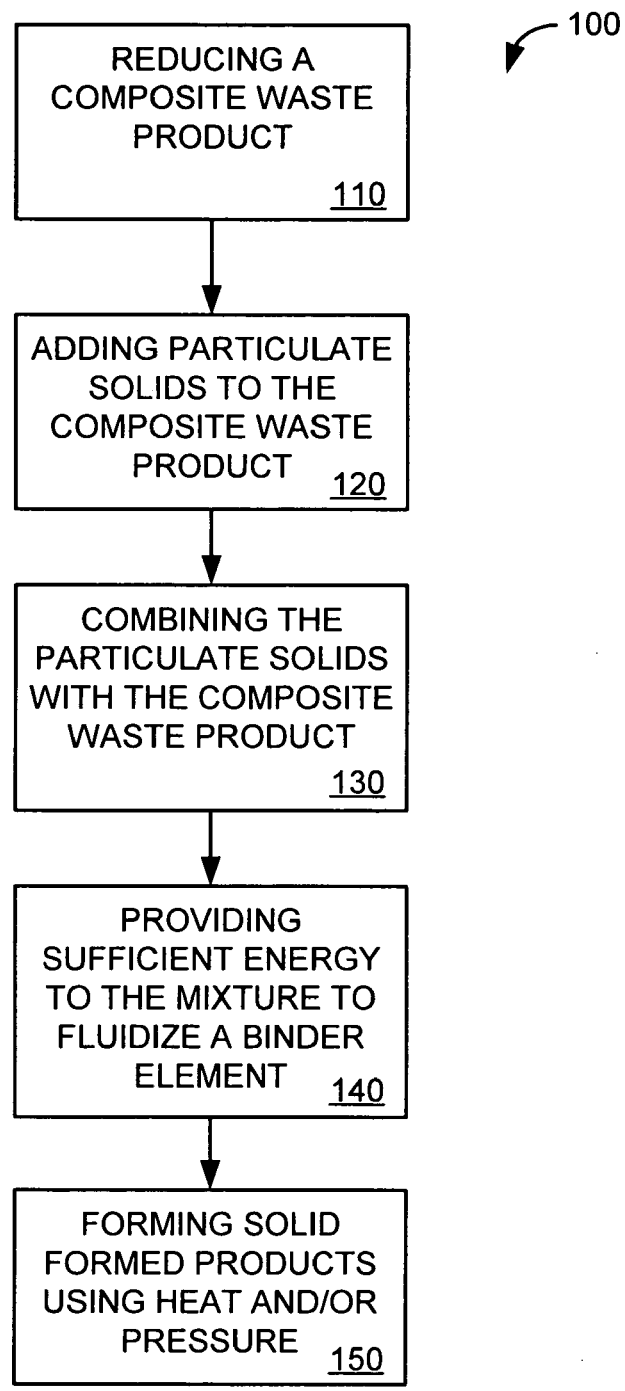
FIG. 1 is a block diagram illustrating an embodiment of the methods disclosed herein.

Reference is now made in detail to the description of the embodiments as illustrated in the drawings. While several embodiments are described in connection with these drawings, there is no intent to limit the disclosure to an embodiment or embodiments disclosed herein. On the contrary, the intent is to cover all alternatives, modifications, and equivalents.

Reference is made to FIG. 1, which is a block diagram illustrating an embodiment of the methods disclosed herein. The method 100 includes reducing a composite waste product 110 through, for example, a shredding or pelletizing process. An exemplary composite waste product in an embodiment herein includes waste carpet. Waste carpet can be, for example, consumer recycled carpet or industrial waste carpet. One of ordinary skill in the art knows or will know that the reducing function can be performed as a separate step prior to the other steps of the method described herein or, alternatively, as an integrated step.

After the composite waste product is reduced, particulate solids are added to the composite waste product 120. The particulate solids may be fuel solids including, but not limited to, coke breeze, coke fines, coal fines and wood wastes. Alternatively, the particulate solids may be non-fuel particulate waste including, but not limited to, particulate radiation contaminates, metal wastes, toxic waste particulates and metal oxides. The adding step 120 may be performed in a batch operation, where all of the particulate solids for a process batch are added at one time. Alternatively, the adding step 120 may be performed in a continuous process where the particulate solids are added in a continuous stream.

The particulate solids are blended with the composite waste product to create a mixture of the composite waste product and the particulate solids 130. In the case of recycled carpet, the composite waste product generally includes, for example, a polypropylene binder element and a nylon fiber element. The temperature of the mixture is increased to fluidize the binder element 140 through, for example, a combination of heat generated by the mixing process and heat provided to the process by external devices 140. The fluid polypropylene binder element captures the fine particulate solids. Further, the nylon carpet fibers become tacky at the temperature at which the binder fluidizes, which causes the nylon carpet fiber to sinter to both the particulate solids and the fluid binder. In an embodiment, the process temperatures for fluidizing the polypropylene binder without fluidizing the nylon fibers are in the exemplary range between 275 degrees F. and 450 degrees F. The combination of the fluid polypropylene binder and the nylon fiber results in a mechanical capture of the particulate material in a combined polypropylene and nylon fiber polymer matrix.

The mixture is then formed into solid formed products, such as, for example, briquettes or pellets, using heat and/or pressure 150. After the forming process, the resulting solid formed product is structurally stable and does not retrogress into fine particles during storage and handling. When particulate solids are fuel based, the solid formed product is bound reliably together and constitutes a high BTU fuel for industrial, utility, and residential use which does not materially pollute the air to a degree different from conventional fuels. In the case of non-fuel particulate solids, such as industrial waste, the solid formed product is bound reliably together and constitutes a durable means of either recycling in a subsequent industrial process or long term stable storage which does not materially pollute the air, soil, or ground water.

Figure 2:
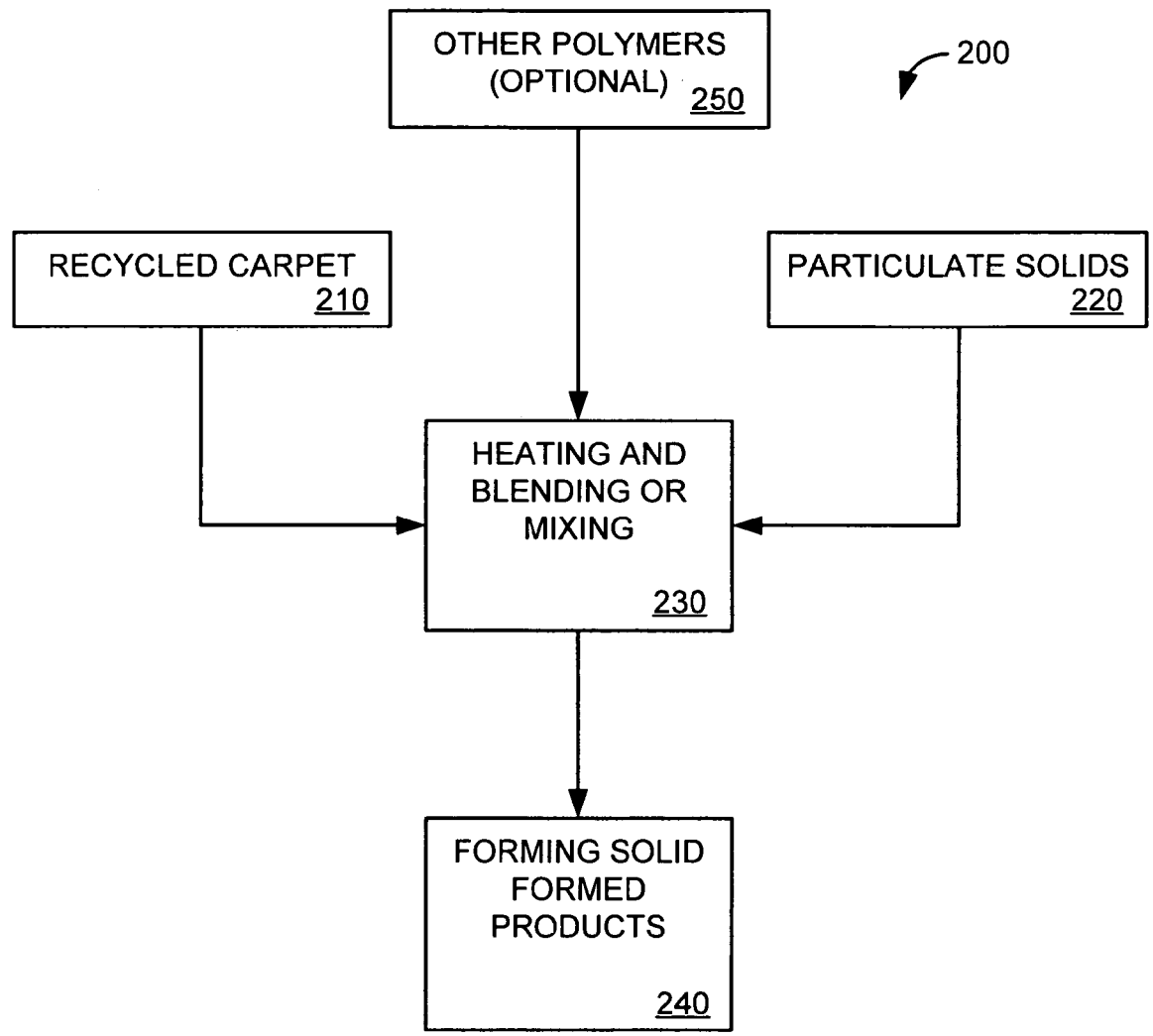
FIG. 2 is a block diagram illustrating an exemplary process under the methods disclosed herein.

Reference is now made to FIG. 2, which illustrates a block diagram of an exemplary process under the methods disclosed herein. The process 200 combines recycled carpet 210 and particulate solids 220 into a mixture by heating and blending or mixing as indicated in block 230. Additionally, other polymers 250 may be optionally added to achieve specific characteristics relating to mechanical properties, chemical composition, or a combination thereof. After the heating and blending or mixing is completed, solid formed products are formed in block 240 using, for example, conventional briquette or pellet forming technology. Additionally, one of ordinary skill in the art knows or will know that the mixture may be formed into solid products including extrusions, sheets or other homogeneous or non-homogeneous shapes, as needed.

Figure 3:
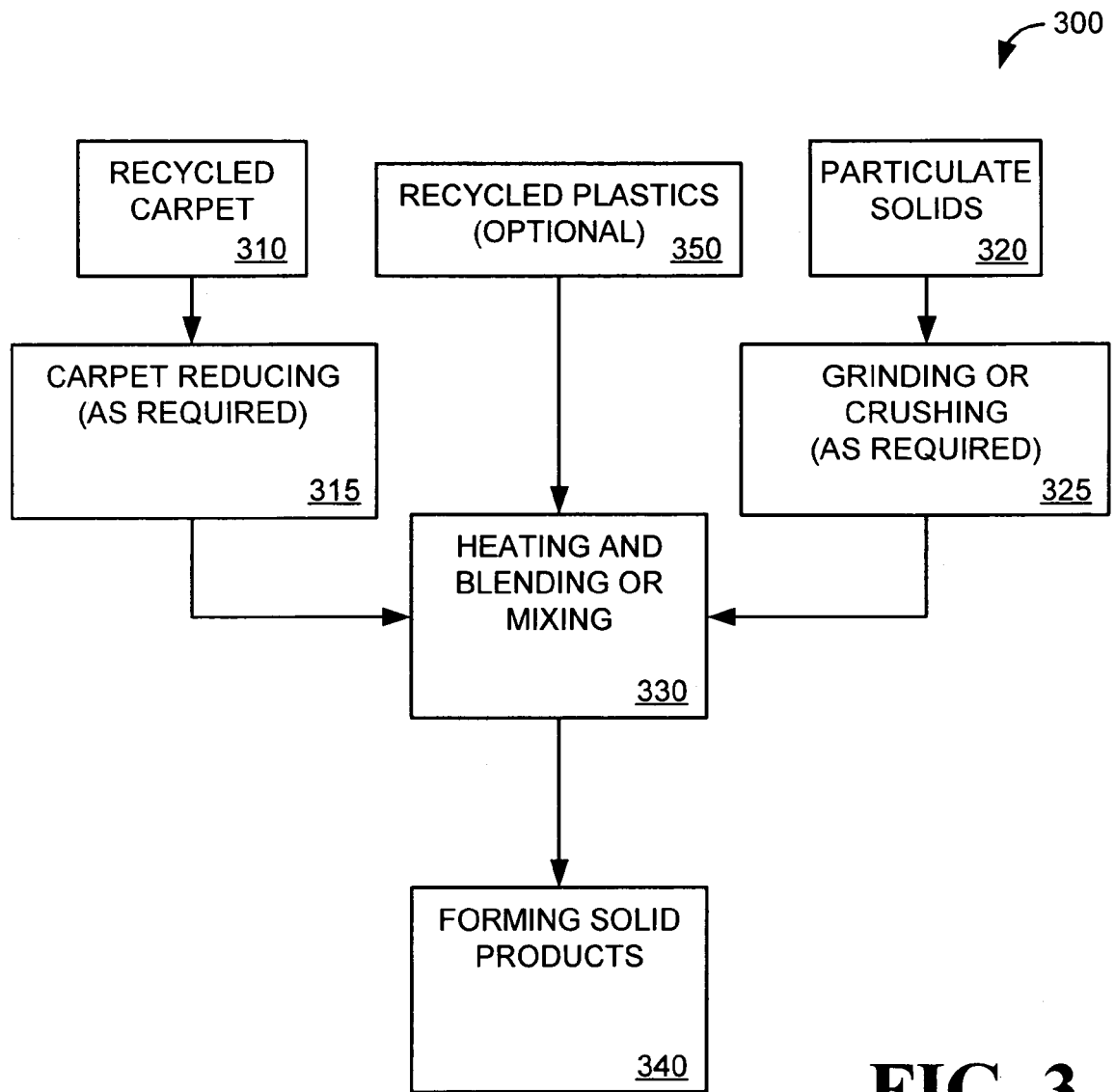
FIG. 3 is a block diagram illustrating an exemplary process under the methods disclosed herein.

Reference is now made to FIG. 3, which illustrates a block diagram of an exemplary process under the methods disclosed herein. The process 300 utilizes recycled carpet 310, which is reduced in step 315. The reducing function includes, but is not limited to, shredding, grinding, pelletizing, and other techniques known by one of ordinary skill in the art. Additionally, as indicated in block 325, particulate solids 320 are processed to achieve a maximum particle size by grinding or crushing. A mixture of the reduced recycled carpet and the ground particulate solids is produced by heating and blending or mixing, as indicated in block 330. Additionally and optionally, recycled plastics may be added to mixture for supplemental fuel content and/or environmentally beneficial disposal. After the heating and blending or mixing is completed, solid products are formed, as indicated in block 340, using conventional forming technology including, but not limited to, the methods and forms discussed above.

Figure 4:
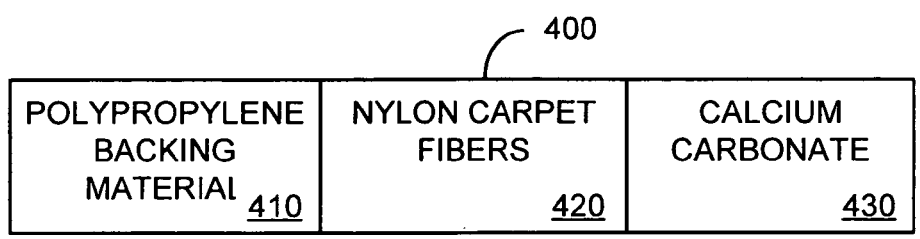
FIG. 4 is a block diagram illustrating a non-limiting example of elements in a composite waste product.

Reference is briefly made to FIG. 4, which is a block diagram illustrating a non-limiting example of elements in a composite waste product. An embodiment of the composite waste product 400 includes, but is not limited to, a polypropylene backing material 410, nylon carpet fibers 420 and calcium carbonate 430. The polypropylene backing material 410 becomes fluid at a processing temperature allowing it to capture the particulate solids. The nylon carpet fibers 420 become tacky, but not fluid at the processing temperature and, in the process of blending, serve to form a fiber matrix in the mixture. The calcium carbonate element, when used in a sulfur containing fuel application and under present combustion methods may result in a reduction of sulfur dioxide emissions. This reduction diminishes or eliminates the utility of powdered limestone injection associated with conventional sulfur dioxide emission reduction methods. Additionally, remaining binding ingredients include other polymers (not shown) as normal components of carpet backing material.

Figure 5:
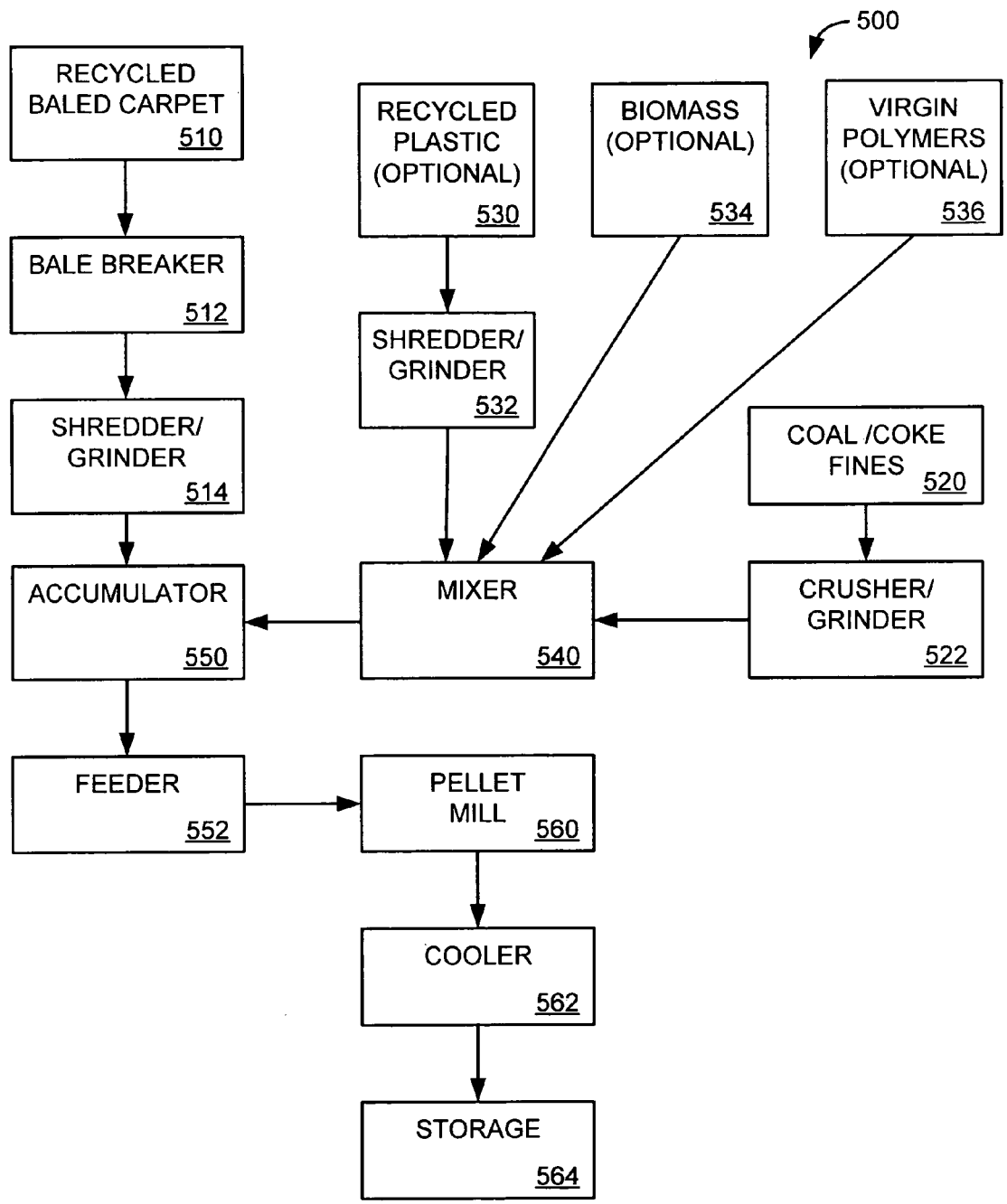
FIG. 5 is a block diagram illustrating an exemplary process under the methods disclosed herein.

Reference is now made to FIG. 5, which is a block diagram illustrating an exemplary process under the methods disclosed herein. An embodiment of the process 500 applies recycled baled carpet 510 to a bale breaker 512 for subsequent processing by a shredder/grinder 514. The shredder/grinder 514 is one of a number of reducing techniques known by one of ordinary skill in the art. The reduced carpet is then received by an accumulator 550. An accumulator 550 receives raw or intermediately processed materials from multiple sources. For example, in this case, the accumulator 550 receives reduced carpet and other materials, as discussed below, for subsequent processing.

As discussed above, recycled plastic 530 is optionally included in the mixture to facilitate improved fuel content, mechanical properties, or a combination thereof, and to facilitate an environmentally beneficial method of disposal. To aid in processing, the recycled plastic 530 is processed through a shredder/grinder 532 and transferred to a mixer 540. In the case where specific chemical or mechanical properties are desirable, additional virgin polymers 536 may be optionally added. Since the virgin polymers 536 are typically purchased in a form ready for processing, such as pellets, the virgin polymers 536 are deposited directly into the mixer 540.

In addition to the recycled plastic 530 and the virgin polymers 536, cellulose material 534, including but not limited to wood wastes, may be optionally added to the mixture 540. The blending of cellulose material 534 provides a partial fuel content from a renewable resource thus extending the life of available fossil fuels, such as the coal, PET coke, or coke fines, with a clean burning alternative synthetic fuel. The synthetic solid fuels can be formed into various shapes and sizes for use in devices including, but not limited to, stoker boilers, pulverized utility boilers, circulating fluidized bed (CFB) boilers, pressurized fluidized bed combustion (PFBC) boilers, coal gasification (IGCC) units, and wood and coal burning furnaces.

Coal or coke fines 520 are processed through a crusher or grinder 522 to reduce the particulate solid fuels to a maximum particle size. The crushed coal or coke fines are then transferred to the mixer 540. The contents of the mixer 540 including the processed coal or coke fines 520, recycled plastic 530, cellulose 534 and virgin polymers 536 is mixed and transferred to the accumulator 550. The accumulator 550, which includes the combined contents of the mixer 540 and the recycled carpet from the shredder/grinder 514, conveys its contents to a pellet mill 560 using a feeder 552.

The pellet mill 560 blends the combined contents and uses, for example, a combination of heat, pressure, and forming technology to form solid products, including but not limited to pellets, briquettes, extrusions or sheets, of the mixture, which are then transferred to a cooler 562. After cooling, the solid products are structurally stable and do not retrogress into fine particles during storage and handling. The solid products are then transferred to storage 564 where they remain intact because the solid particulate materials are encapsulated to prevent degradation, leaching or contamination into the environment. The solid products also exhibit resistance to moisture because the moisture is driven out by the process heat and then sealed out by the encapsulating function of the binder element.

Figure 6:
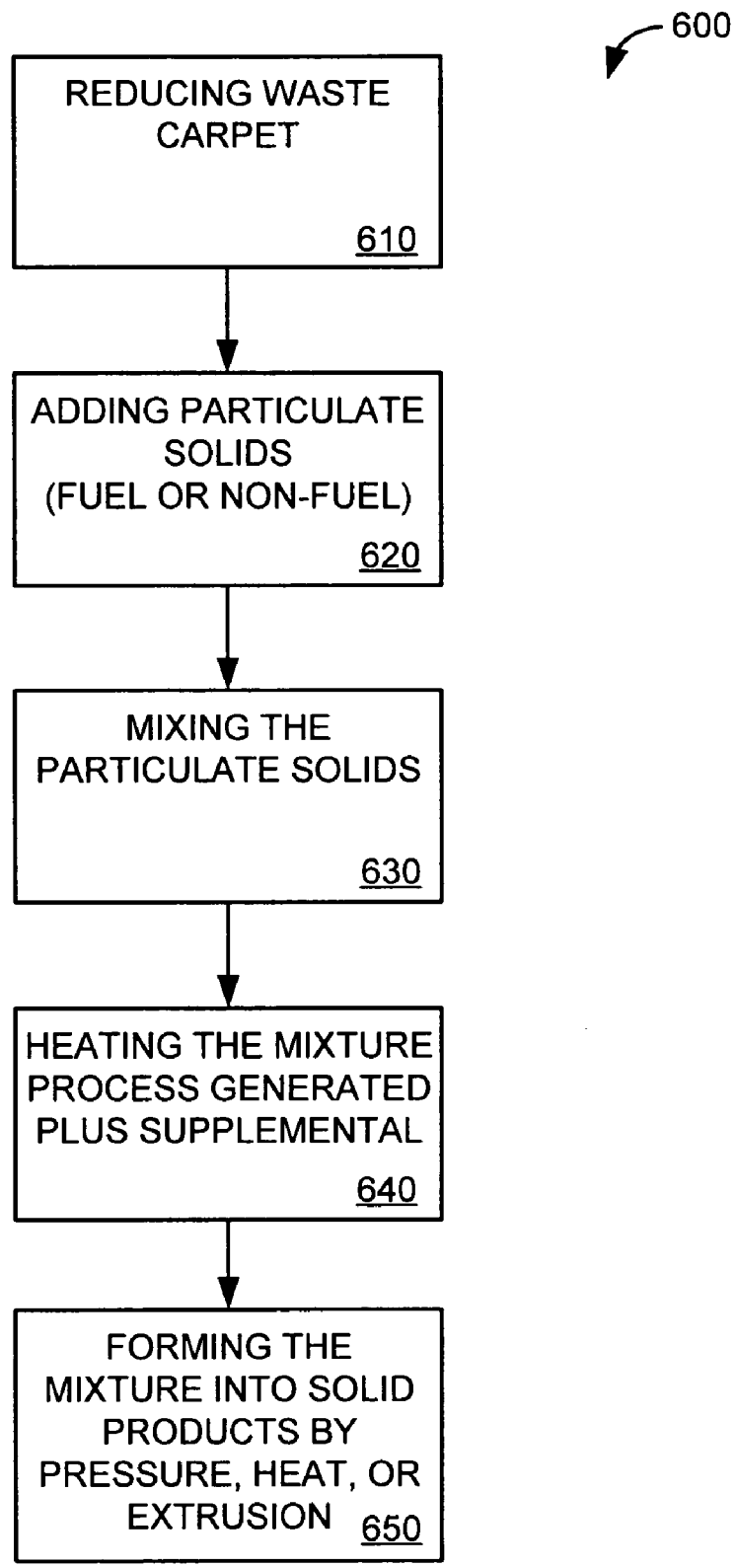
FIG. 6 is a block diagram illustrating an exemplary process under the methods disclosed herein.

Reference is now made to FIG. 6, which illustrates a block diagram of an exemplary process under the methods disclosed herein. The process 600 includes reducing waste carpet 610 including, but not limited to, shredding, grinding or pelletizing the waste carpet. Particulate solids, which may have a fuel content are added 620 and the particulate solids are mixed with the waste carpet 630. The mixture is heated using, for example, a combination of heat generated by the process plus any supplemental heat necessary to fluidize the binder element of the waste carpet 640. One of ordinary skill in the art knows or will know that supplemental heat may be provided by any number of methods including, but not limited to, electric resistive and inductive devices, combustion causing devices, electromagnetic wave devices, and recaptured heat from other processes. After the mixing is completed, the mixture is formed into solid products by pressure, heat or extrusion 650, for example.

Figure 7:
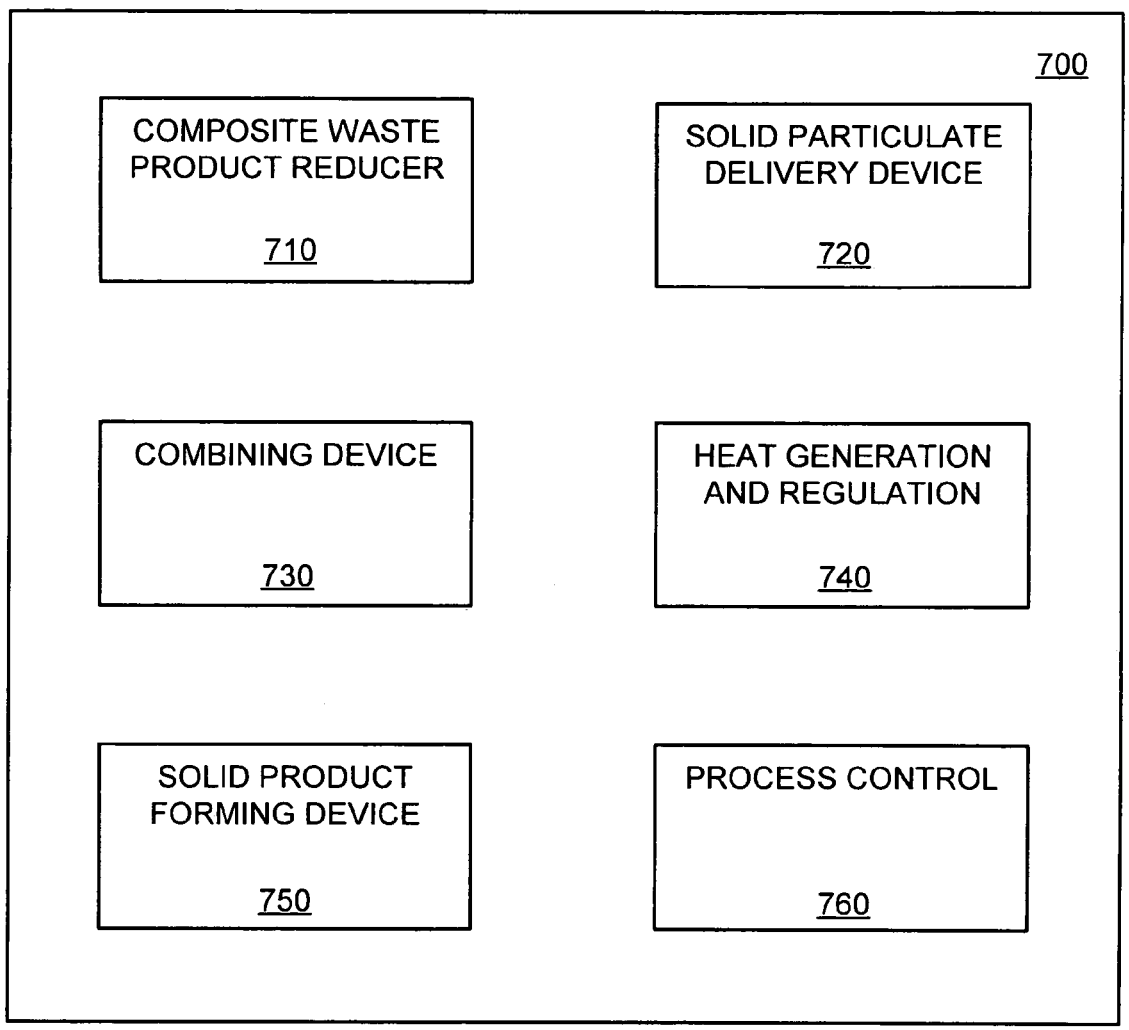
FIG. 7 is a block diagram illustrating components of an exemplary production plant for practicing the methods disclosed herein.

Reference is now made to FIG. 7, which is a block diagram illustrating components of an exemplary production plant for practicing the methods disclosed herein. The plant 700 includes a composite waste reducer 710, which, for example, shreds, grinds, or pelletizes waste carpet. A solid particulate delivery device 720 provides solid particulates to the reduced composite waste at, for example, a combining device 730. The combining device 730 combines the reduced composite waste product with particulate solids to create a mixture. Additionally and possibly in combination with the combining device 730, heat generation/regulation equipment 740 provides sufficient supplemental heat to the mixture to fluidize one element of the composite waste product. The heated mixture is then provided to a solid product forming device 750, configured to produce solid formed products. The solid formed products include but are not limited to pellets, briquettes, extrusions and sheets, among others. As discussed above, the solid formed products may be produced for subsequent consumption wherein the solid particulates have a useful fuel content or other desirable recycle value. Alternatively, the solid formed product may provide a safe and effective method of storing and handling useful or potentially harmful solid particulate materials. The plant 700 also includes sufficient process control equipment 760 such that the production steps are integrated into a continuous process. In the alternative, the process control equipment 760 is configured, for example, to perform production steps in independent stages.

The methods described herein do not require water, acids or any other chemical or elemental component from the particulate solids to form the bond. As a result, virtually any particulate or blended materials can be reliably pelletized using methods described herein. Although waste carpet is presented in an embodiment described herein, one of ordinary skill in the art knows, or will know that any composite waste product having binder and fiber elements may be used. For example, polymer impregnated cloth used in some industrial processes may also be a suitable composite waste product.

It should be emphasized that the above-described embodiments of the present disclosure, particularly, any illustrated embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, having thus described the disclosure, at least the following is claimed:

1. A method for binding particulate solids, consisting essentially of:
   reducing a composite waste product, wherein the composite waste product comprises carpet;
   adding particulate solids to the composite waste product, wherein the particulate solids comprise materials with fuel content;
   combining the particulate solids with the composite waste product to create a consistent mixture;
   adding energy to the mixture to increase a process temperature, such that a component of the composite waste product changes from a solid state to a fluid state; and
   forming the mixture into a solid formed product.

2. The method of claim 1, wherein the carpet comprises a polypropylene binder element and a nylon fiber element.

3. The method of claim 1, wherein the carpet comprises:
   a first element comprising a backing material, wherein the backing material exhibits a first fluidizing temperature; and
   a second element comprising a fiber material, wherein the fiber material exhibits a second fluidizing temperature, and wherein the first fluidizing temperature is lower than the second fluidizing temperature.

4. The method of claim 1, wherein the particulate solids are selected from the group comprising: coke breeze, coke fines, and coal fines.

5. The method of claim 1, further comprising adding a cellulose material, wherein the cellulose material comprises a renewable fuel resource for supplementing the fuel content of the particulate solids.

6. The method of claim 1, wherein the fuel content per solid formed product is standardized.

7. The method of claim 1, wherein the particulate solid further comprises non-fuel waste materials.

8. The method of claim 1, wherein the solid formed product comprises a polymer fiber matrix, such that the particulate solids are reliably retained.

9. The method of claim 1, wherein the particulate solids include recycled plastic materials.

10. The method of claim 2, wherein the carpet further comprises calcium carbonate.

11. The method of claim 2, wherein the particulate solids include materials with sulfur content.

12. A method for binding particulate solids, consisting essentially of:
   reducing a composite waste product, wherein the composite waste product comprises carpet;
   adding particulate solids to the composite waste product;
   combining the particulate solids with the composite waste product to create a consistent mixture;
   adding energy to the mixture to increase a process temperature, such that a component of the composite waste product changes from a solid state to a fluid state;
   forming the mixture into a solid formed product; and
   adding a supplemental polymer associated with the solid formed product, such that the supplemental polymer results in different solid formed product properties.

13. The method of claim 12, wherein the particulate solids comprise non-fuel waste materials.

14. A degradation resistant fiber matrix solid product consisting essentially of:
   a carpet including a binder element and a fiber element, wherein the binder element fluidizes at a first temperature, wherein the fiber element fluidizes at a second temperature, and wherein the first temperature is lower than the second temperature; and
   a particulate solid, wherein the binder captures the particulate solid when blended at a temperature in the range between the first temperature and the second temperature;
   wherein the particulate solid comprises fuel particulates.

15. The solid product of claim 14, wherein the fuel particulates are selected from the group including: coke breeze, coke fines, and coal fines.

16. The solid product of claim 14, wherein the solid product is formed using an extrusion process.

17. The solid product of claim 14, wherein the solid product exhibits moisture resistance.

18. The solid product of claim 14, wherein the first temperature is about 275 degrees F. and the second temperature is about 450 degrees F.

19. A degradation resistant fiber matrix solid product consisting essentially of:
   a carpet including a binder element and a fiber element, wherein the binder element fluidizes at a first temperature, wherein the fiber element fluidizes at a second temperature, and wherein the first temperature is lower than the second temperature; and
   a particulate solid, wherein the binder captures the particulate solid when blended at a temperature in the range between the first temperature and the second temperature; and
   a cellulose particulate product, wherein the cellulose particulate product provides a renewable resource fuel content to the solid product.

20. A degradation resistant fiber matrix solid product consisting essentially of:
   a carpet including a binder element and a fiber element, wherein the binder element fluidizes at a first temperature, wherein the fiber element fluidizes at a second temperature, and wherein the first temperature is lower than the second temperature; and
   a particulate solid, wherein the binder captures the particulate solid when blended at a temperature in the range between the first temperature and the second temperature;
   wherein the particulate solid comprises non-fuel particulate material; and
   wherein the non-fuel particulate material is selected from the group including: particulate radiation contaminants, metal particulates, toxic waste particulates, and metal oxide particulates.

21. A method for capturing particulate solids in a degradation resistant form, consisting essentially of:
   a reducing means for shredding or pelletizing carpet;
   a supplying means for adding particulate solids to the carpet;
   a mixing means for blending the carpet and the particulate solids into a mixture;
   a heating means for elevating the temperature of the mixture such that a binder element of the carpet achieves a fluid state and a fiber element of the carpet retains a solid state;
   a forming means for converting the mixture into a solid, wherein the solid comprises a polymer fiber matrix which captures the particulate solids; and
   a supplying means for adding a supplemental polymer, such that the supplemental polymer results in different solid formed product properties.

22. The method of claim 21, wherein the particulate solids comprise materials with fuel content.

23. A plant for binding particulate solids, consisting essentially of:
   a composite waste product reducer that reduces the composite waste product, the composite waste product comprising carpet, wherein the composite waste product reducer reduces other polymers in addition to the carpet;
   a delivery device for adding a solid particulate product to a reduced composite waste product;
   a combining device configured to provide a mixture of the reduced composite waste product and the solid particulate product;
   a heater for increasing the temperature of the mixture such that a first element of the mixture fluidizes; and
   a forming device such that a solid product is created from the mixture.

24. The plant of claim 23, wherein the solid particulate product comprises materials with fuel content.

25. The plant of claim 23, wherein the forming device creates the solid product in a form selected from the group including: a pellet form, a briquette form, an extruded form, and a sheet form.

26. A degradation resistant fiber matrix solid product consisting essentially of:
   a carpet including a binder element and a fiber element, wherein the binder element fluidizes at a first temperature, wherein the fiber element fluidizes at a second temperature, and wherein the first temperature is lower than the second temperature;
   a particulate solid, wherein the binder captures the particulate solid when blended at a temperature in the range between the first temperature and the second temperature; and
   a supplemental polymer, such that the supplemental polymer results in different solid formed product properties.

27. The solid product of claim 26, wherein the supplemental polymer comprises a virgin polymer.

* * * * *